US009413901B2

(12) United States Patent
Suga

(10) Patent No.: US 9,413,901 B2
(45) Date of Patent: Aug. 9, 2016

(54) IMAGE COMMUNICATING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Daisuke Suga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/627,610

(22) Filed: Feb. 20, 2015

(65) Prior Publication Data
US 2015/0249751 A1    Sep. 3, 2015

(30) Foreign Application Priority Data

Mar. 3, 2014  (JP) .................................. 2014-041050

(51) Int. Cl.
*H04M 3/42*  (2006.01)
*H04M 19/08*  (2006.01)

(52) U.S. Cl.
CPC ..................................... *H04M 19/08* (2013.01)

(58) Field of Classification Search
USPC ................................ 379/207.05, 395.01, 413
See application file for complete search history.

(56) References Cited

U.S. PATENT DOCUMENTS

| 6,094,698 | A | * | 7/2000 | Namikawa | .............. G06F 8/665 710/74 |
| 7,092,113 | B1 | | 8/2006 | Saito et al. | .................... 358/1.15 |
| 7,139,088 | B2 | | 11/2006 | Murata et al. | ................. 358/1.15 |
| 7,564,578 | B2 | | 7/2009 | Saito et al. | .................... 358/1.15 |
| 2003/0224835 | A1 | * | 12/2003 | Everett | .............. H04W 52/0296 455/572 |
| 2008/0229132 | A1 | * | 9/2008 | Suga | ........................ B41J 29/38 713/324 |
| 2014/0169540 | A1 | | 6/2014 | Suga et al. | .......... H04M 7/0054 |

FOREIGN PATENT DOCUMENTS

JP    10-164292    6/1998
JP    2006-295791 A  10/2006

OTHER PUBLICATIONS

U.S. Appl. No. 14/519,779, filed Oct. 21, 2014.
U.S. Appl. No. 14/548,750, filed Nov. 20, 2014.

* cited by examiner

*Primary Examiner* — Quynh Nguyen
(74) *Attorney, Agent, or Firm* — Fitzpatrick, Cella, Harper & Scinto

(57) ABSTRACT

An image communicating apparatus which includes a telephone control unit configured to control a telephone includes a controller with a main CPU, and a power supply control unit configured to control power supply. When transiting to a sleep mode, the controller stops power supply to itself, and also supplies power to the telephone control unit so that the telephone control unit can detect at least off-hook of the telephone. When the off-hook of the telephone is detected in the sleep mode, the telephone control unit starts power supply to the controller, holds a dial signal input while the controller is activated, and transmits the held dial signal to the controller upon completion of activation of the controller.

8 Claims, 12 Drawing Sheets

F I G. 4A
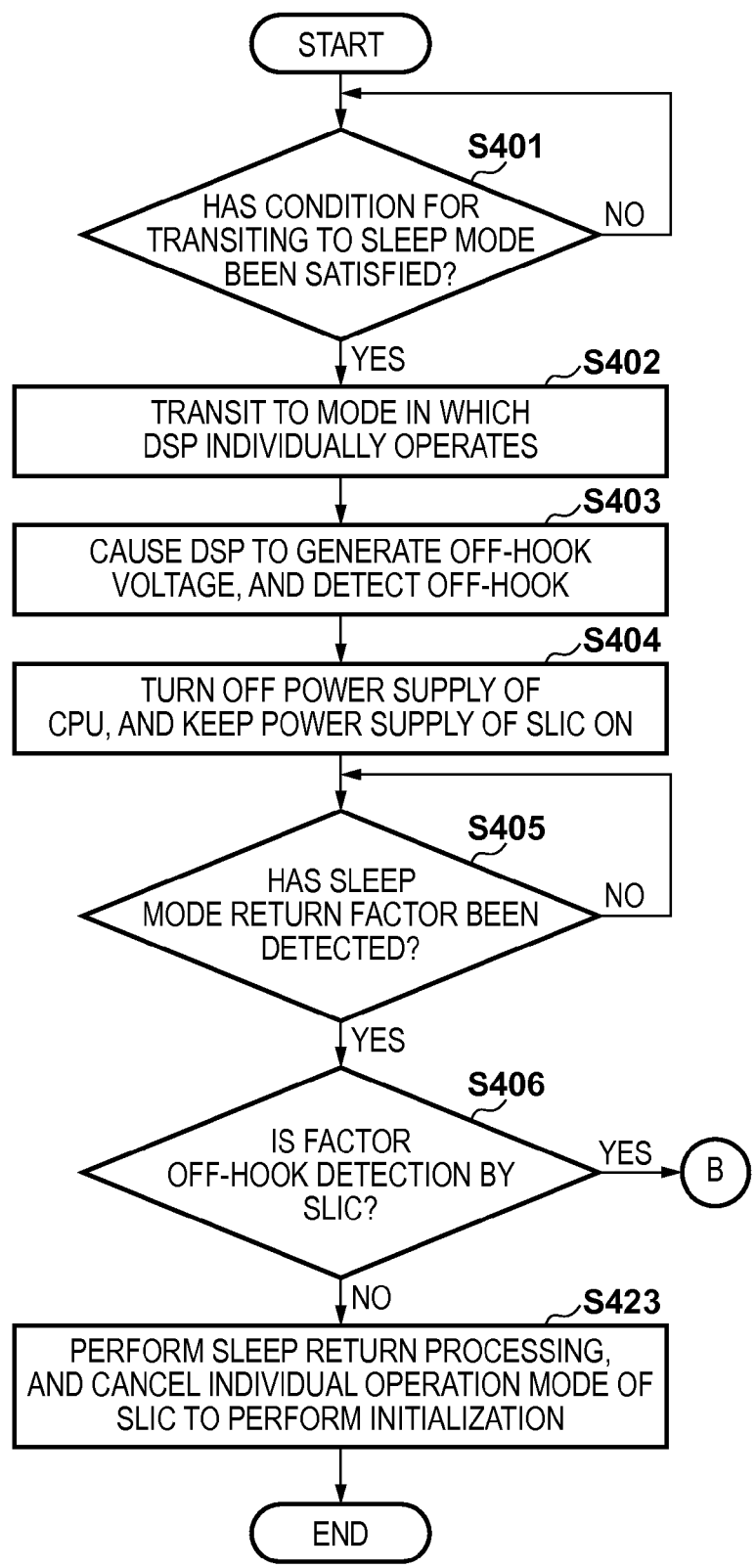

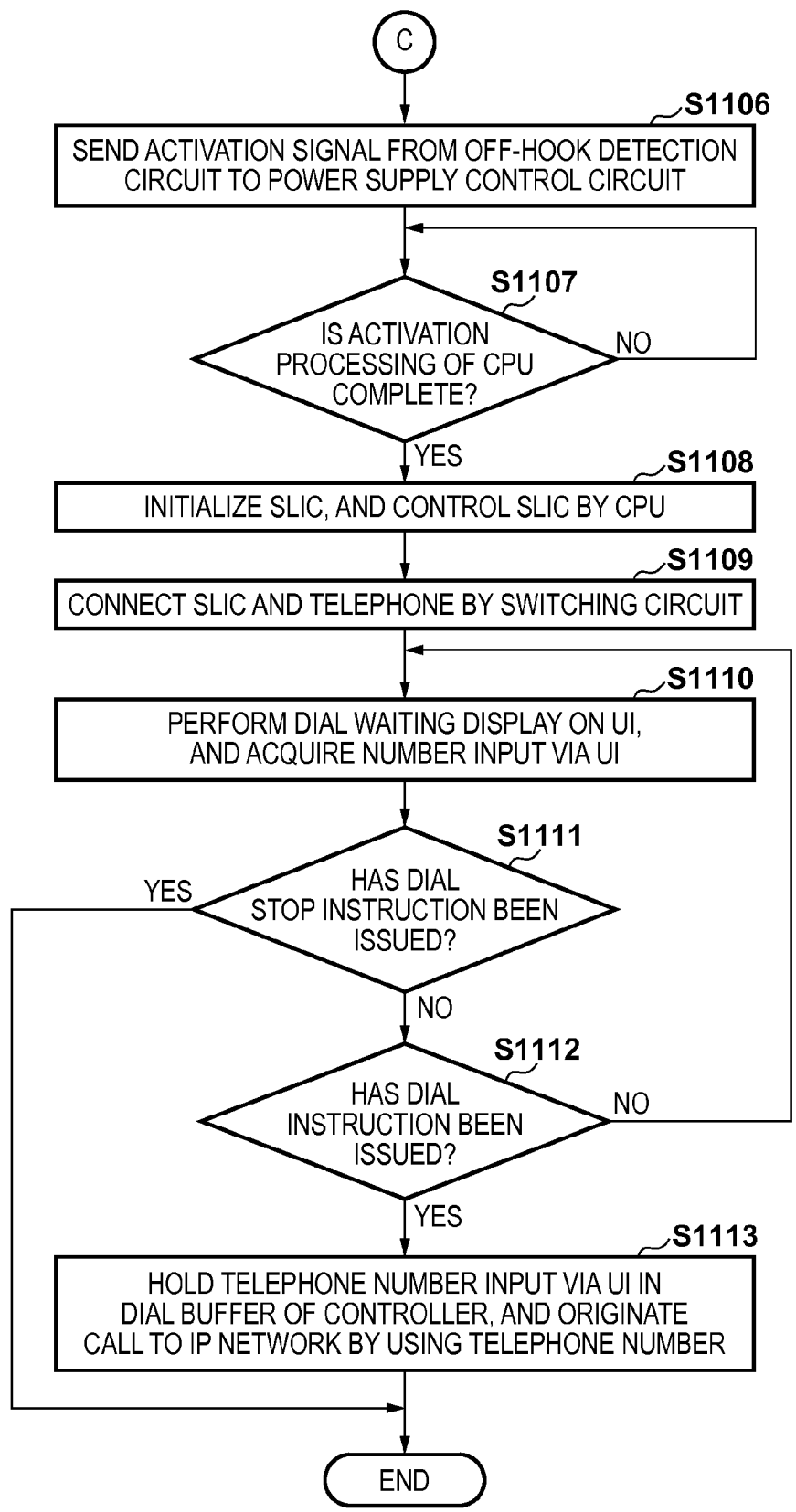

IMAGE COMMUNICATING APPARATUS, CONTROL METHOD THEREFOR, AND STORAGE MEDIUM STORING PROGRAM

BACKGROUND OF THE INVENTION

1. Field of the Invention

The present invention relates to an image communicating apparatus, a control method therefor, and a storage medium storing a program.

2. Description of the Related Art

A method of using an IP network as a communication path for performing voice communication by IP (Internet Protocol) phones or image communication complying with T.38 of ITU-T recommendation has been established in recent years. In T.38, a G3 FAX (T.30) signal is converted into an IP message on the IP network, and transmitted in real time. Furthermore, deemed voice communication in which a modem signal tone is deemed as a voice to form PCM data and the PCM data is communicated as a voice packet on the IP network is performed. FAX communication using the T.38 protocol can decrease a bandwidth as compared with deemed voice communication requiring a voice bandwidth, and does not require modulation of data into a modem signal, thereby allowing high-speed communication.

On the other hand, in deemed voice communication, it is possible to communicate with a G3 FAX apparatus on a conventional analog telephone network connected via a VoIP GW (Voice over IP Gateway) arranged on the IP network. Furthermore, on the IP network, it is possible to simultaneously create one or a plurality of sessions, and parallelly execute a plurality of communication processes including, for example, voice communication and image communication. A private IP network can be used as a communication path, and an NGN (Next Generation Network) can be used as a communication path. The NGN is an IP network which includes a bandwidth guarantee function and security function in the network itself, and integrally implements a phone service, video communication service, data communication service, and the like. SIP (Session Initiation Protocol) in which a virtual session is established between communicating apparatuses on the IP network or NGN and a service is provided while the session is established has become widespread. Communicating apparatuses which have establish a session using SIP are provided with services of various forms which perform voice communication or image communication or simultaneously perform both of them using a protocol such as IP or VoIP (Voice Over IP).

There are provided various forms of image communicating apparatuses. For example, there is provided an image communicating apparatus which has an IP phone function and can connect a PSTN (Public Switched Telephone Network)-capable analog telephone as an external telephone. To control a PSTN-capable telephone, a SLIC (Subscriber Line Interface Circuit) for controlling a telephone is required. The SLIC has a function of performing D/A conversion or A/D conversion of a speech voice signal, a function of generating a calling signal to cause the ringer of a telephone to ring, a function of generating an off-hook voltage of the telephone, a function of detecting off-hook, and the like. The SLIC generates various tone signals after detecting off-hook, and detects a DTMF (Dual Tone Multi Frequency) signal or dial pulse signal sent by the telephone. Since such SLIC can provide a function of emulating a line, it can connect an analog telephone to the IP network without the intervention of the PSTN.

In the case of an incoming voice call, the medium type of a session establishment request (INVITE signal) by SIP is "audio" (voice). In the case of T.38, the medium type is "application" or "image". Therefore, communication can be discriminated. With this feature, when an INVITE signal with a medium type "audio" is received from a calling side, the SLIC discriminates communication as voice communication to generate a calling signal, thereby causing the ringer of an analog telephone to ring. When the called-side user responds with the analog telephone, the SLIC detects the off-hook of the analog telephone to stop the calling signal, and transmits a successful response (200 OK) to the calling side. The calling side returns ACK to establish an audio session, thereby entering a voice communication state.

The SLIC for controlling a telephone is necessary between the IP network and a PSTN-capable telephone. Since it is generally desirable that the telephone is always available, it is necessary to always supply power to the SLIC for controlling a telephone. It is also necessary to always supply power to the main CPU of a controller circuit for controlling the SLIC so as to be operable.

On the other hand, the image communicating apparatus has an energy saving mode for reducing the power consumption, and the state of the energy saving mode will also be referred to as a sleep mode. To satisfy the standard by reducing the electric current consumption in the energy saving mode, it is necessary to cut off power supply to a portion such as a SLIC or main CPU for executing telephone control. If, however, this is done, the telephone cannot be used in the energy saving mode. A measure to cope with this is required.

Japanese Patent Laid-Open No. 10-164292 describes a technique in which after a facsimile apparatus enters a standby state with low power consumption, if an off-hook detection circuit detects the off-hook of a telephone, the facsimile apparatus is activated from the standby state with low power consumption. Furthermore, Japanese Patent Laid-Open No. 2006-295791 describes a technique of limiting the display and operation of an unusable function when setting which of a handset and a slave is to be used. Note that the handset is assumed to be a telephone without any operation function such as a calling ten-key pad for instructing a partner destination. The slave is assumed to be a telephone with an operation function such as a calling ten-key pad which can be used to instruct a partner destination.

Image communicating apparatuses which perform voice communication via an IP network include an image communicating apparatus capable of connecting, as an external telephone, a telephone which is connected to the PSTN and used. To connect a PSTN-capable telephone, a telephone control unit (SLIC) for controlling a telephone is necessary. As the telephone control unit, the above-described SLIC having a voice data conversion function, a calling signal control function, and the like is used. Since, however, the telephone is required to always operate for an incoming call, it is necessary to always supply power to the SLIC to be operable. Since the SLIC is controlled by the main CPU of the controller circuit, it is also necessary to always supply power to the main CPU to be operable. Consequently, it is impossible to sufficiently reduce the power consumption in the sleep mode.

SUMMARY OF THE INVENTION

An aspect of the present invention is to eliminate the above-mentioned problems with the conventional technology.

The present invention provides a technique of further reducing the power consumption in a sleep mode.

The present invention in one aspect provides an image communicating apparatus which includes a telephone control unit configured to control a telephone, comprising: a controller with a main CPU; and a power supply control unit configured to control power supply, wherein when transiting to a sleep mode, the controller stops power supply to the controller, and also controls the power supply control unit to supply power to the telephone control unit so that the telephone control unit can detect at least off-hook of the telephone, and when the off-hook of the telephone is detected in the sleep mode, the telephone control unit causes the power supply control unit to start power supply to the controller, holds a dial signal input while the controller is activated, and transmits the held dial signal to the controller upon completion of activation of the controller.

According to the present invention, it is possible to stop power supply to a main CPU, thereby transiting to a sleep state.

Further features of the present invention will become apparent from the following description of exemplary embodiments with reference to the attached drawings.

BRIEF DESCRIPTION OF THE DRAWINGS

FIGS. 4A and 4B are flowcharts illustrating processing executed by the image communicating apparatus when transiting to a sleep mode and activating from the sleep mode;

FIGS. 11A and 11B are flowcharts illustrating processing executed by the image communicating apparatus when transiting to the sleep mode and activating from the sleep mode.

DESCRIPTION OF THE EMBODIMENTS

Figure 1:
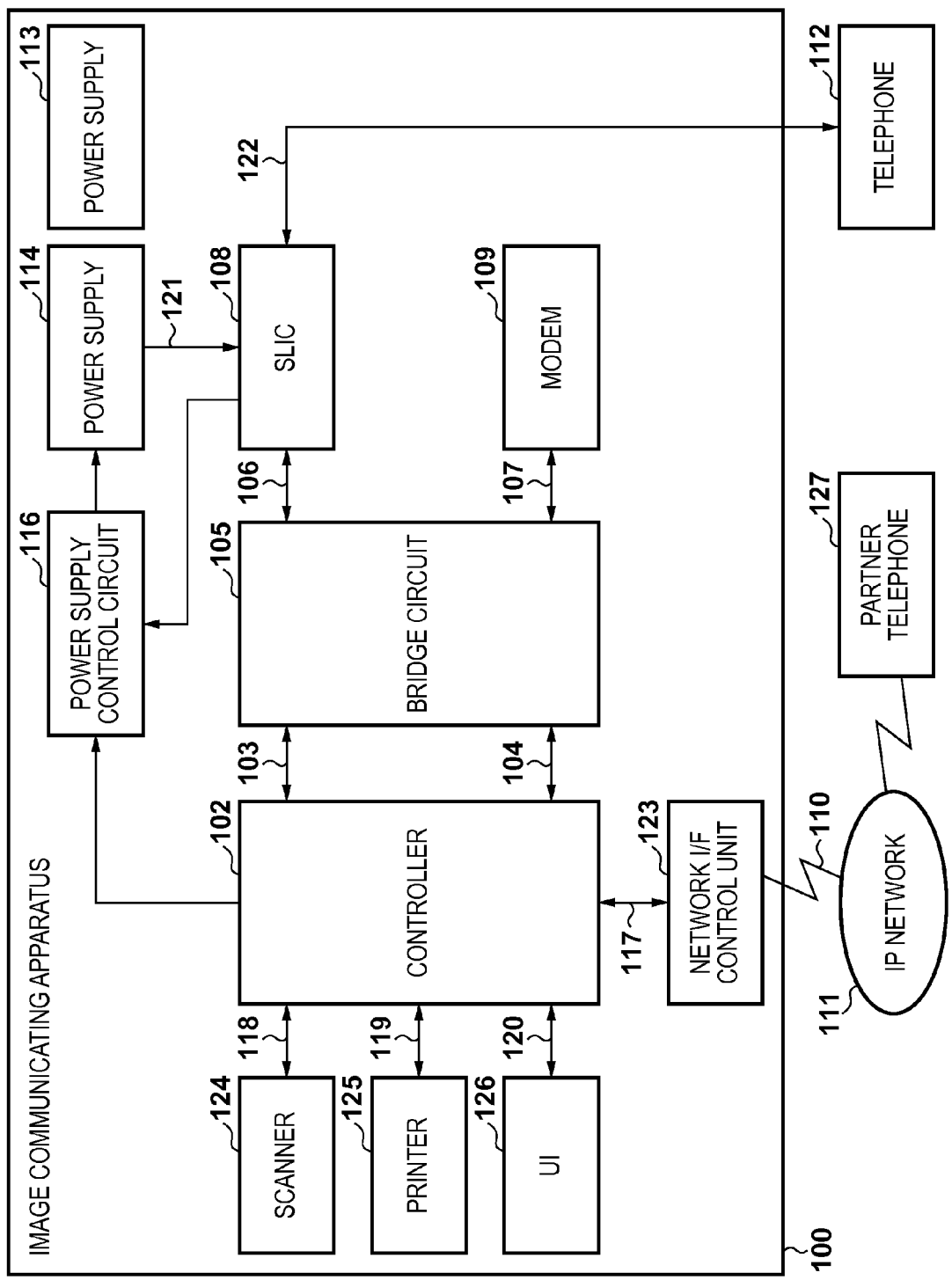
FIG. 1 is a block diagram showing the hardware arrangement of an image communicating apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components and a description thereof will be omitted.

First Embodiment

FIG. 1 is a block diagram showing the hardware arrangement of an image communicating apparatus 100 according to the first embodiment of the present invention.

A controller 102 is a control unit which controls the overall image communicating apparatus 100. The main function of the image communicating apparatus 100 is to print on a paper sheet based on image data obtained by reading a document or image data received via an IP network 111, and save the image data or transfer the image data to another apparatus via a network or line. The image communicating apparatus 100 is connected to a network 110 all the time, and exchanges data with another image communicating apparatus, a PC, or a server.

A network including a gateway for connecting the Internet, an intranet, and an NGN to each other, a DNS server for attaining name resolution, and a SIP server is assumed as the IP network 111. DNS is an abbreviation for Domain Name Server, and SIP is an abbreviation for Session Initiation Protocol. The image communicating apparatus 100 is connected to the IP network such as an intranet, the Internet, or the NGN through the network 110 via an appropriate hub, router, or HGW (home gateway). A LAN (Local Area Network) line such as 10BASE-T, 100BASE-TX, or 1000BASE-T is generally used as the network 110.

A SLIC (telephone control unit) 108 serves as an interface with a telephone 112, which is usable by connecting to the PSTN (Public Switched Telephone Network), to connect the telephone 112 to the IP network. The main functions of the SLIC 108 are a function of controlling a calling signal, applying a DC current, detecting off-hook, and performing A/D conversion of an output voice signal of the telephone 112 to encode the signal into a PCM signal, and a function of decoding a PCM signal to perform D/A-conversion and generating an input voice signal of the telephone 112. Since the controller 102 controls the SLIC 108 to exchange PCM voice data between the controller 102 and the SLIC 108, serial interfaces 103 and 106 connect the controller 102 and the SLIC 108. On the other hand, since the controller 102 controls a modem 109 to exchange PCM voice data between the controller 102 and the modem 109, serial interfaces 104 and 107 connect the controller 102 and the modem 109. A general interface such as a UART, SPI, or PCM interface is used as the serial interface 103, 104, 106, or 107. A bridge circuit 105 is an adjustment circuit which performs interface conversion between the controller 102 and the SLIC 108 and between the controller 102 and the modem 109, buffers serial data to be transmitted or received, and generates a serial data transmission/reception timing. When the controller 102 and the SLIC 108 or modem 109 transmit data, if one of them includes the UART interface and the other includes the SPI interface and thus they cannot be directly connected because of their different interface forms, they perform conversion via the bridge circuit 105. The modem 109 performs modulation/demodulation using PCM of the VoIP packet of a deemed voice, thereby enabling G3 FAX communication.

A power supply 114 supplies power for the operation of the image communicating apparatus 100 to each unit of the image communicating apparatus 100 in a normal operation. In the sleep mode, power supply to some or all of the units of the image communicating apparatus 100 is cut off. On the other hand, a power supply 113 is used to always supply power to a portion required to operate in the image communicating apparatus 100, and is implemented by a high-efficiency power supply. Note that the energy saving mode will be referred to as a sleep mode hereinafter. The power supply 113 may be used as an all-night power supply.

Figure 3:
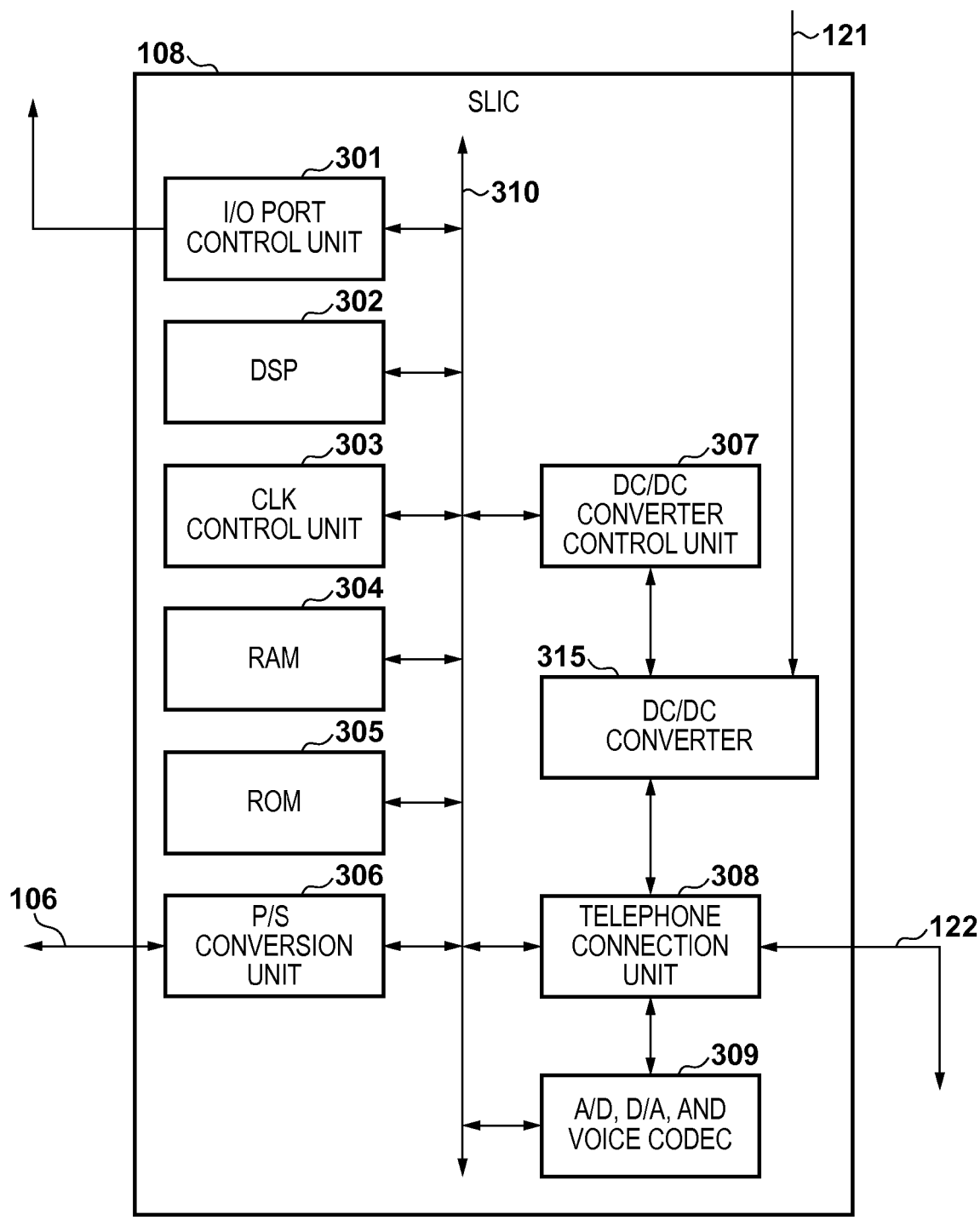
FIG. 3 is a block diagram showing the arrangement of the SLIC of the image communicating apparatus.

In the SLIC 108, a voltage supplied from the power supply 114 via a power supply line 121 is supplied to a DC/DC converter 315 (FIG. 3) controlled by an internal DC/DC converter control unit 307 (FIG. 3). Since the DC/DC converter 315 converts the voltage into a calling signal of the telephone 112 or a DC voltage to be supplied to the line of the telephone 112, the power consumption is large. The arrangement of the SLIC 108 will be described in detail later with reference to FIG. 3.

A network I/F control unit 123 controls transmission/reception of data to/from the network 110, and analyzes and generates IP packets of TCP, UDP, RTP, and the like. After data to be transmitted or received by transmission/reception of IP packets are temporarily saved in a RAM 203 or HDD 217 (FIG. 2) of the controller 102, they are processed according to protocol rules. The image communicating apparatus 100 can perform call connection, data communication, and voice communication with a communication partner using a SIP session via the network I/F control unit 123 and the IP network 111. An interface 122 connects the SLIC 108 and the telephone 112.

Figure 2:
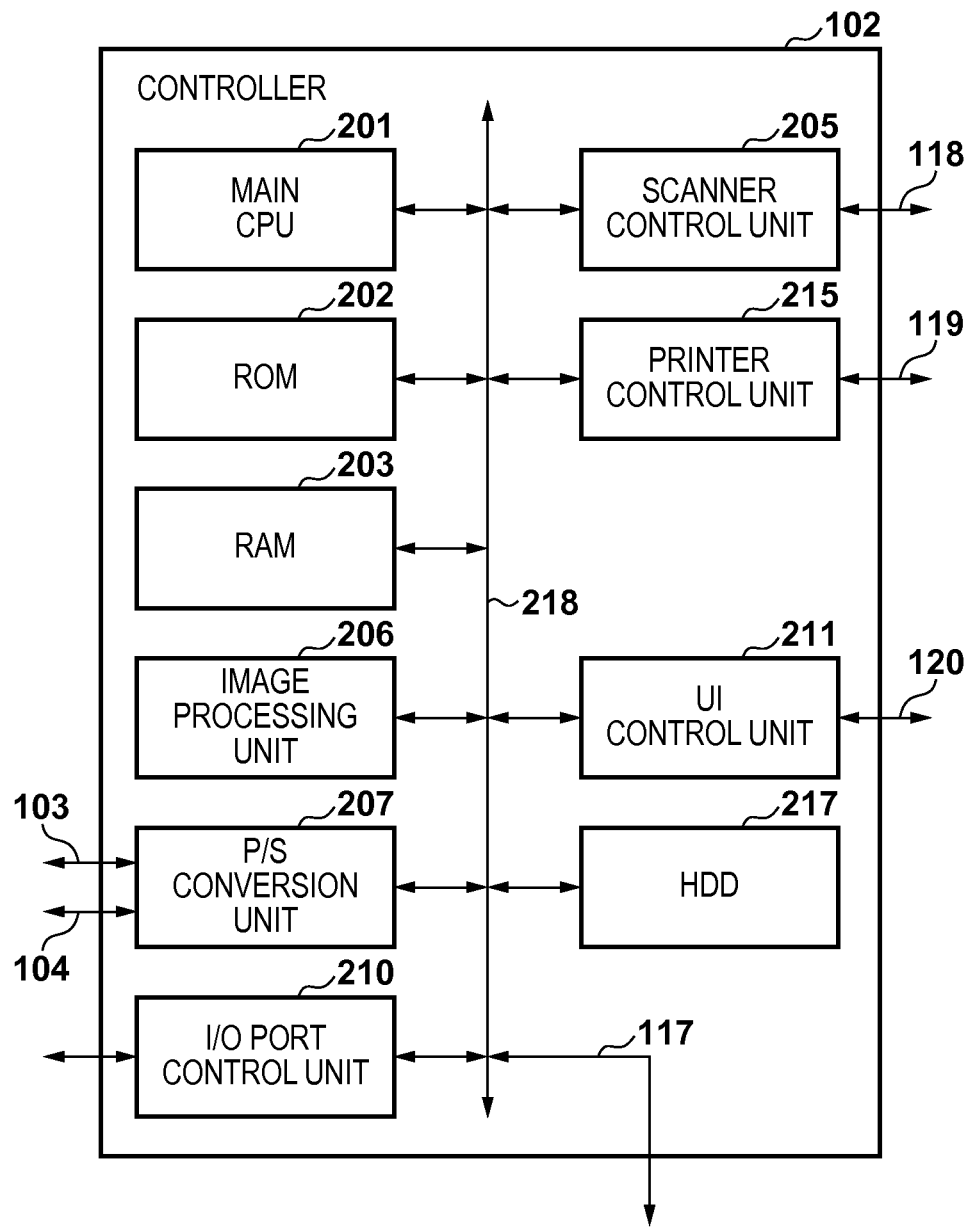
FIG. 2 is a block diagram showing the arrangement of the controller of the image communicating apparatus.

FIG. 2 is a block diagram for explaining the arrangement of the controller 102 of the image communicating apparatus 100 according to the first embodiment.

A bus 218 is a system bus via which control signals from a main CPU (to be referred to as a CPU hereinafter) 201 and data signals between respective units are transmitted/received. The bus 218 is connected to a scanner control unit 205, the CPU 201, a ROM 202, the RAM 203, the HDD 217, a printer control unit 215, a UI control unit 211, an image processing unit 206, a P/S conversion unit 207, and an I/O port control unit 210. The P/S conversion unit 207 performs parallel/serial conversion of data, and is connected to the bridge circuit 105. The I/O port control unit 210 is connected to the units of the image communicating apparatus 100, and is used by, for example, a power supply control circuit 116 to control OFF/ON of the power supply 114.

The CPU 201 reads out the control program of the image communicating apparatus 100 from the ROM 202 or the HDD 217, loads it into the RAM 203, and executes it, thereby controlling the overall apparatus. The ROM 202 stores the boot program, permanent parameters, and the like of the apparatus. A flash memory is used as the ROM 202 in this example. Note that the ROM 202 is not limited to a flash memory, and other types of memories may be used. The RAM 203 is also used to store temporary work data, image data, print data, and the like when the CPU 201 controls the image communicating apparatus 100. The HDD 217 is a hard disk drive, and is used to store various data such as image data, print data, and destination registration information. The RAM 203 and HDD 217 are also used as work areas by the CPU 201 to process and encode/decode image data and perform resolution conversion. The image processing unit 206 performs image processing of improving the quality of image data, resolution conversion, and encoding/decoding by hardware. The RAM 203 and HDD 217 are also used as work areas by the CPU 201 to encode and decode data to be transmitted and to process an IP packet.

The UI control unit 211 is connected to a UI 126 and a UI I/F 120, thereby controlling the UI 126. The UI 126 displays various kinds of information, and is used to input an instruction from the user. The UI 126 includes a ten-key pad used to input a dial number or a numeric character, a start key, a stop key, other operation keys, an LED, and a display unit incorporating a touch panel, and receives an operation instruction from the user and provides information to the user. The printer control unit 215 is connected to a printer 125 and a printer I/F 119, thereby controlling the printer 125. The scanner control unit 205 is connected to a scanner 124 and a scanner I/F 118, thereby controlling the scanner 124. The I/O port control unit 210 connects an input/output unit (not shown) to output, to the CPU 201 via the bus 218, data input from the outside, or to receive data from the CPU 201 and output it to the outside.

The CPU 201 receives a VoIP packet from the IP network 111 via the network I/F control unit 123, and transmits PCM data obtained by analyzing the VoIP packet to the SLIC 108 or modem 109. Also, the CPU 201 generates a VoIP packet from a PCM data transmitted from the SLIC 108 or modem 109, and transmits the VoIP packet to the IP network 111 via the network I/F control unit 123. FAX communication performed by modulation/demodulation of the modem 109 using the PCM data of the VoIP packet is called communication by a deemed voice. The modem 109 has a function of modulating and demodulating a voice signal based on ITU-T recommendation, and is used for data transmission and procedure control of FAX communication. The image communicating apparatus 100 performs call connection with an IP phone of a partner telephone 127 using a SIP session via the IP network 111, and transmits a VoIP packet, thereby performing voice communication between the partner telephone 127 and the telephone 112 connected to the SLIC 108.

FIG. 3 is a block diagram for explaining the arrangement of the SLIC 108 of the image communicating apparatus 100 according to the first embodiment.

A bus 310 is a system bus via which control signals from a DSP (Digital Signal Processor) 302 and data signals between respective units are transmitted/received. The bus 310 is connected to an I/O port control unit 301, the DSP 302, a CLK control unit 303, a RAM 304, a ROM 305, a P/S conversion unit 306, the DC/DC converter control unit 307, and a telephone connection unit 308, thereby allowing data transmission between these units. An A/D conversion circuit, D/A conversion circuit, and voice codec 309 are also connected to the bus 310.

The telephone 112 incorporates a microphone and loudspeaker, and is used by the user to perform voice communication by outputting the voice data of a partner from the loudspeaker and inputting the voice of the user from the microphone. The telephone 112 is connected to the telephone connection unit 308 of the SLIC 108 via the telephone connection interface 122. The DSP 302 controls the DC/DC converter control unit 307. The DC/DC converter control unit 307 controls the DC/DC converter 315 to generate a calling signal and a DC voltage for off-hook detection. The telephone connection unit 308 of the SLIC 108 supplies the calling signal and off-hook detection voltage generated by the DC/DC converter 315 to the telephone 112 via the telephone connection interface 122. After the telephone 112 captures a DC current, the analog voice signals of voice communication are input/output to/from the telephone 112 via the telephone connection interface 122.

The SLIC 108 integrally includes the analog/digital conversion circuit (A/D), digital/analog conversion circuit (D/A), and voice encoding/decoding circuit (voice codec) 309, and can perform A/D conversion, D/A conversion, and voice encoding/decoding processing. The DSP 302 reads out a control program from the ROM 305, loads it into the RAM 304, and executes it, thereby controlling the operation of the SLIC 108. The SLIC 108 A/D-converts an analog voice signal input from the telephone 112, performs signal processing using the DSP 302, converts the signal into PCM data in a G.711 format or another encoded data using the voice codec, and transmits the data to the controller 102 via the P/S conversion unit 306. After that, the controller 102 performs processing of converting the data into a VoIP packet, and transmits the VoIP packet to the IP network 111. Furthermore, the DSP 302 has a calculation function, and is suitable to digital signal calculation processing. Also, the controller 102 processes a VoIP packet received from the IP network 111, converts the processed VoIP packet into PCM data in a G.711 format or another encoded data, and transmits the data to the SLIC 108. The SLIC 108 decodes the PCM data in the G.711 format or the other encoded data received via the P/S conversion unit 306 by using the voice codec, performs signal processing using the DSP 302, performs D/A conversion, and transmits the resultant data to the telephone 112. This outputs a voice from the loudspeaker of the telephone 112.

The SLIC 108 controls a slave used in the PSTN. For example, the SLIC 108 detects the off-hook of the telephone 112, applies a DC current, and sends a calling signal. A portion including the DC/DC converter 315 necessary for detecting off-hook, applying a DC current, and generating a calling signal is referred to as the SLIC 108. In this embodiment, the DC/DC converter 315 is integrated with the SLIC 108. However, the DC/DC converter 315 may be arranged as an external circuit. Furthermore, the DSP 302 of the SLIC 108 can perform DTMF detection or tone detection, thereby detecting a destination designation signal for call origination. The telephone connection unit 308 of the SLIC 108 can detect dial pulses, thereby detecting a destination designation signal for call origination. In dial pulse detection, a change in voltage level across the telephone 112 is detected to perform determination. The SLIC 108 has a function of generating various tone signals. When off-hook is detected while no calling signal is sent, the SLIC 108 sends a dial tone to the telephone 112. The SLIC 108 can detect a DTMF signal or dial pulse signal sent by the telephone 112 to detect the dial number of a calling partner, and transmit the dial number of the calling partner to the SIP server on the IP network 111, thereby performing call connection. The SLIC 108 can connect the telephone 112 to execute control and data conversion, and also perform call connection with the partner telephone 127 via the IP network 111, thereby performing voice communication. Upon detecting the off-hook of the telephone 112, the DSP 302 can send an activation signal to the power supply control circuit 116 via the I/O port control unit 301.

Figure 4B:
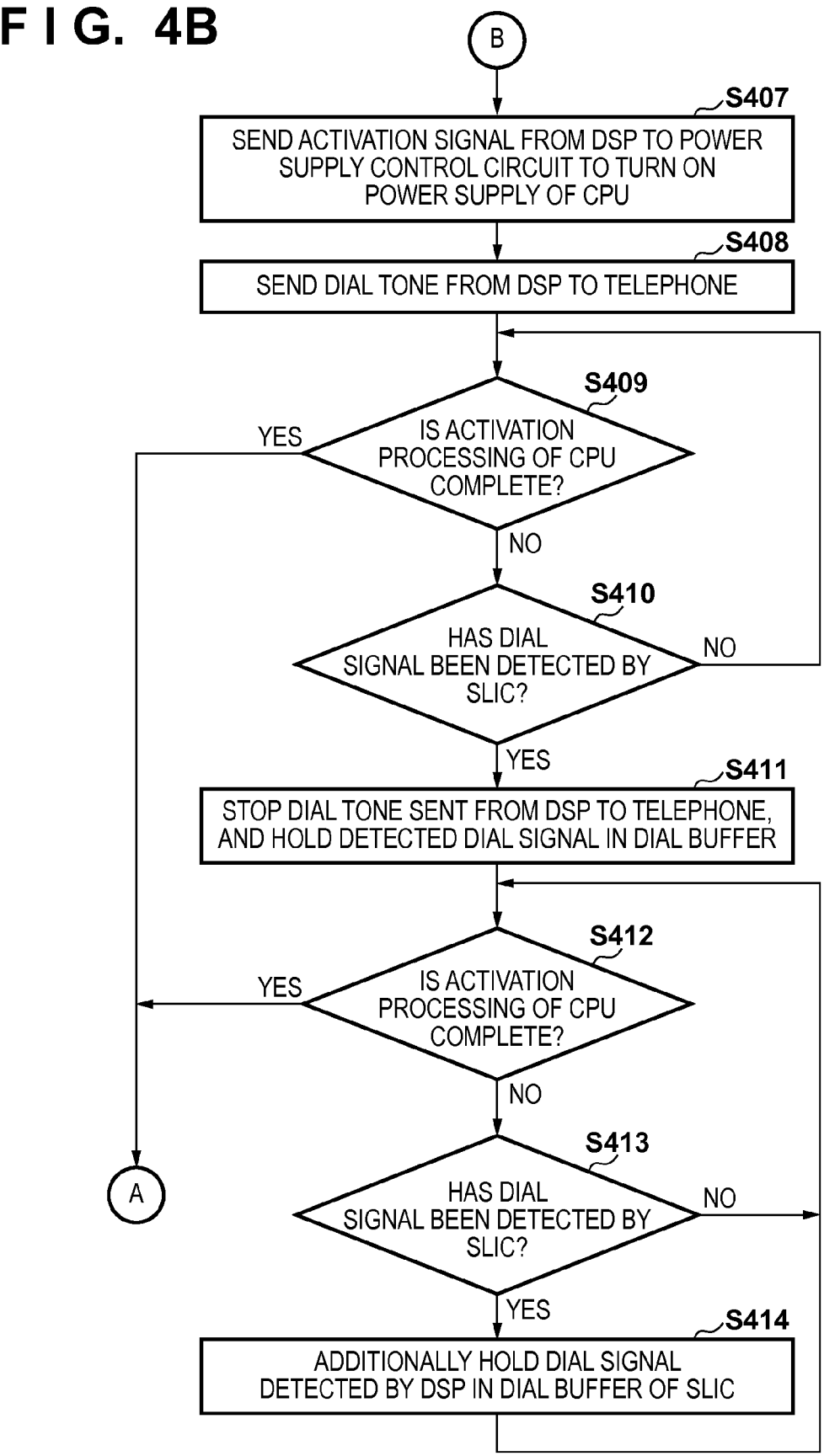
Figure 5:
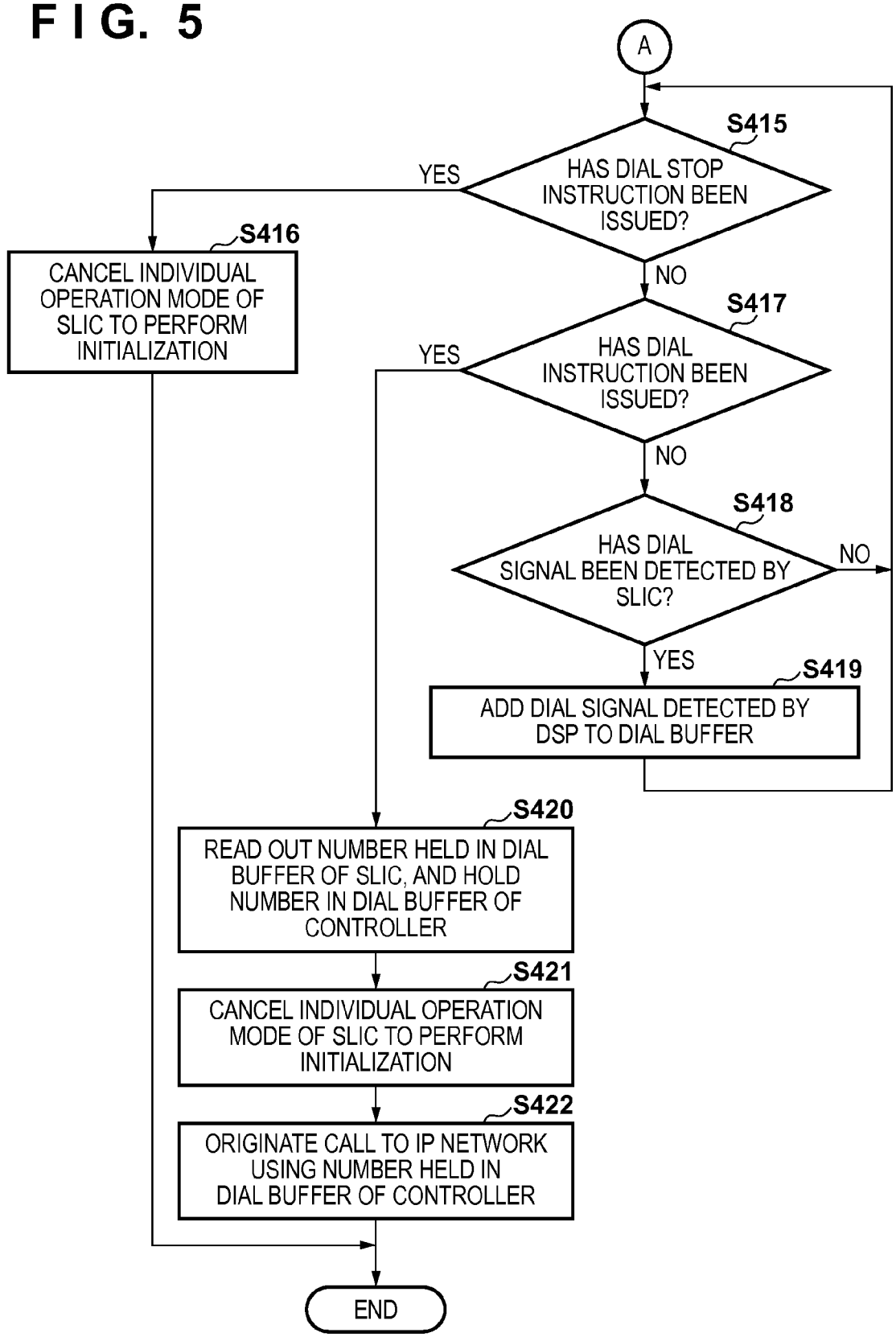
FIG. 5 is a flowchart illustrating the processing executed by the image communicating apparatus when transiting to a sleep mode and activating from the sleep mode.

FIGS. 4A, 4B and 5 are flowcharts for explaining processing executed by the image communicating apparatus 100 when transiting to the sleep mode and activating from the sleep mode according to the first embodiment of the present invention. The processing shown in the flowcharts is implemented when the CPU 201 reads out a program from the ROM 202 or HDD 217, loads it into the RAM 203, and executes it. Note that the DSP 302 executes, for example, steps S405 to S414 of the flowcharts.

First, the image communicating apparatus 100 is in a standby state after power-on, and the user can perform an arbitrary operation for the image communicating apparatus 100. In step S401, the CPU 201 determines whether a condition for transiting to the sleep mode has been satisfied. In this example, for example, if no copy instruction from the user, no print instruction from the network I/F control unit 123, no incoming voice call, or no T.38 incoming FAX call has been received for a given time, it is determined that the condition for transiting to the sleep mode has been satisfied, and the process advances to step S402. Note that the given time is counted using the RTC (Real Time Clock) (not shown) of the UI control unit 211 or the operation clock of the CPU 201 or the like.

In step S402, the CPU 201 causes the SLIC 108 to transit to a mode in which the DSP 302 of the SLIC 108 individually operates. At this time, the CPU 201 switches to supply the clock used by the SLIC 108 from an independent oscillator so that the SLIC 108 can individually operate. Alternatively, a clock frequency input to the SLIC 108 may be stored, and an internal oscillator may generate the clock. This allows the DSP 302 to control the CLK control unit 303 and operate. At this time, the DSP 302 prepares, in the DSP 302 or the RAM 304 of the SLIC 108, a register for holding data indicating that the SLIC 108 has transited to the mode in which it individually operates. For example, a value "1" in the register indicates the mode in which the DSP 302 individually operates, and a value "0" in the register indicates the mode in which the DSP 302 operates under the control of the CPU 201. In the mode in which the SLIC 108 individually operates, the operation is limited not to process a voice signal for voice communication, and thus it is possible to operate the apparatus with power consumption lower than usual by operating the apparatus according to a clock lower than usual.

The process advances to step S403, and the CPU 201 causes the DSP 302 to generate an off-hook voltage, and perform off-hook detection. An off-hook detection voltage is generally about 24 V to 48 V. The process then advances to step S404, and the CPU 201 performs processing of stopping the operations of circuits except for those for monitoring a return factor which causes the CPU to return from the sleep mode in order to transit to the sleep mode. After that, the CPU 201 controls the power supply control circuit 116 to stop power supply to the circuits except for those for monitoring a return factor which causes the CPU to return from the sleep mode. The power supply control circuit 116 controls the power supply 114, and turns off part of the power supply 114. The power supply control circuit 116 can control the power supply system of the power supply 114 to supply power to only necessary portions and stop power supply to unnecessary portions. In this example, the power supply control circuit 116 stops power supply to circuits for which power supply is desirably stopped in the sleep mode, for example, the controller 102 including the CPU 201, the modem 109, the bridge circuit 105, the scanner 124, the printer 125, and the backlight of the display unit of the UI 126. On the other hand, the power supply control circuit 116 controls the power supplies 114 and 113 to continuously supply power to the circuits for monitoring a sleep return factor, for example, the SLIC 108, the DC/DC converter 315, part of the UI control unit 211, and the network I/F control unit 123. For example, there exist a plurality of 12-V systems as a power supply, which are distributed to the controller 102 including the CPU 201, the modem 109, the bridge circuit 105, the scanner 124, the printer 125, the backlight of the display unit of the UI 126, the SLIC 108, and the DC/DC converter 315. In this case, it is possible to stop power supply to the unnecessary portions by turning on/off part of the power supply of 12 V. One 12-V system of the power supply supplies power to the DC/DC converter 315. A DC/DC converter or regulator (not shown) of each unit converts 12 V of the power supply into a voltage such as 5 V, 3.3 V, or 1.8 V necessary for each function to operate, and the voltage is used. When the CPU transits to the sleep mode in this way, the process advances to step S405.

In the sleep mode, the circuits for monitoring a sleep mode return factor monitors in step S405. If the circuits detect a sleep mode return factor, the process advances from step S405 to step S406; otherwise, the process returns to step S405. For example, the DSP 302 monitors the off-hook of the telephone 112. Also, the network I/F control unit 123 monitors a sleep mode return factor such as reception of a print job, T.38 FAX reception, G3 FAX reception of a deemed voice, an incoming call from an IP phone, or a key operation in the UI 126 to return from the sleep mode.

If the user off-hooks the telephone 112 in the sleep mode, the telephone 112 captures a DC current. If the DSP 302 detects that a DC current equal to or higher than a threshold flows or the off-hook voltage for off-hook detection decreases to a threshold or lower, it is determined that the telephone 112 has been off-hooked. If the sleep mode return factor is off-hook detection by the SLIC 108, the process advances from step S406 to step S407; otherwise, the process advances from step S406 to step S423.

In step S407, the DSP 302 sends an activation signal to the power supply control circuit 116 via the I/O port control unit 301. This causes the power supply control circuit 116 to control the power supply 114, thereby turning on the power supply 114. This enables power supply to the controller 102 including the CPU 201, the modem 109, the bridge circuit 105, and other circuits required to operate. The CPU 201 reads out a control program from the ROM 202 or HDD 217, loads it into the RAM 203, and executes it, thereby starting activation processing. The process then advances to step S408.

In step S408, the DSP 302 sends a 400-Hz dial tone to the telephone 112, thereby advancing to step S409. In step S409, the DSP 302 determines whether the activation processing of the CPU 201 is complete. Whether the activation processing of the CPU 201 is complete is determined by reading out the value in the above-described register, which indicates that the SLIC 108 has transited to the mode in which it individually operates. If the value indicates that the SLIC 108 is in the mode in which it individually operates, when the value in the register is read out, it is determined that the activation processing of the CPU 201 is complete, and the process advances to step S415 (FIG. 5). Note that as for the processing of determining whether the activation processing of the CPU 201 is complete, a CPU-activated register may be additionally provided in the DSP 302 or RAM 304 of the SLIC 108, and then it may be determined that the activation processing of the CPU 201 is complete when the CPU 201 accesses the register. For example, as a value in the register, which indicates whether the CPU 201 has been activated, a value "1" indicates that the CPU 201 has been activated and a value "0" indicates that the CPU 201 has not been activated. This value is cleared to "0" when the SLIC 108 transits to the mode in which it individually operates. On the other hand, if it is determined in step S409 that the activation processing of the CPU 201 is not complete, the process advances to step S410.

In step S410, it is determined whether the DSP 302 has detected a dial signal such as a DTMF signal or dial pulse signal from the telephone 112. If it is determined that a dial signal has been detected, the process advances to step S411; otherwise, the process returns to step S409. In step S411, the DSP 302 stops the dial tone sent from itself to the telephone 112. This is done to notify the user of the telephone 112 that the dial signal of the first digit has been detected. The detected dial signal is held in the dial buffer of the SLIC 108. The dial buffer is provided in a register usable by the DSP 302 of the SLIC 108 or a memory area of the RAM 304. For example, if "0" has been detected by DTMF, "0" is held in the dial buffer. The process then advances to step S412.

In step S412, the DSP 302 determines whether the activation processing of the CPU 201 is complete. The determination method is the same as in step S409 described above. If it is determined that the activation processing of the CPU 201 is complete, the process transits to step S415 (FIG. 5). If it is determined in step S412 that the activation processing of the CPU 201 is not complete, the process advances to step S413, and it is determined whether the DSP 302 has detected a dial signal such as a DTMF signal or dial pulse signal from the telephone 112. If the signal has been detected, the process advances to step S414; otherwise, the process returns to step S412.

In step S414, the dial signal detected by the DSP 302 is additionally held in the dial buffer of the SLIC 108. For example, if "3" is detected by DTMF in step S414 after "0" is stored in the dial buffer in step S411, "3" is additionally held in the dial buffer in step S414. Consequently, "03" is stored in the dial buffer. The process then returns to step S412.

If it is determined in step S406 that the sleep mode return factor is not off-hook detection by the SLIC 108, the process advances to step S423. This applies to a sleep mode return factor other than off-hook detection by the SLIC 108. If a sleep mode return factor such as reception of a print job by the network I/F control unit 123, T.38 FAX reception, G3 FAX reception of a deemed voice, an incoming call from an IP phone, or a key operation in the UI 126 has been detected, an activation signal is sent to the power supply control circuit 116. With this processing, the power supply control circuit 116 controls the power supply 114 to turn it on, thereby starting power supply to the controller 102 including the CPU 201 and other units required to operate. This causes the CPU 201 to read out a control program from the ROM 202 or HDD 217, load it into the RAM 203, and execute it, thereby starting activation processing. The CPU 201 returns from the sleep mode, and the sleep mode return factor is discriminated, thereby performing appropriate processing. At this time, the CPU 201 cancels the individual operation mode of the SLIC 108 to perform initialization. The CPU 201 returns, to "0", the value in the register indicating that the SLIC 108 has transited to the mode in which it individually operates, thereby setting a value indicating that the SLIC 108 operates under the control of the CPU 201. The CPU 201 issues a reset signal to the SLIC 108 to cancel the mode, and initializes various register settings. Also, the CPU 201 switches the clock used by the SLIC 108 to a clock output from the bridge circuit 105 or modem 109. After that, the CPU 201 controls the SLIC 108 to control the telephone 112. Sleep return processing caused by a factor except for off-hook detection by the SLIC 108 is not essential to the embodiment, and a description thereof will be omitted. The process then ends, thereby transiting to the normal standby state.

The process advances to step S415 of FIG. 5, and the CPU 201 determines whether a dial stop instruction has been issued. At this time, since the CPU 201 has been activated to control the overall apparatus, it is possible to detect an operation input via the UI 126. If, for example, the user issues a dial stop instruction via the touch panel of the UI 126 or by a key operation, the process of the CPU 201 transits to step S416. Even if the user on-hooks the telephone 112 and the SLIC 108 detects the on-hook of the telephone 112, it is determined that a dial stop instruction has been issued. If the telephone 112 stops capturing a DC current, and the DC current becomes equal to or lower than a threshold or the off-hook voltage for off-hook detection becomes equal to or higher than a threshold, the DSP 302 determines that the telephone 112 has been off-hooked. The CPU 201 can detect whether a dial stop instruction has been issued by inquiring of the SLIC 108 about the on-hook state of the telephone 112. If it is determined that no dial stop instruction has been issued, the process transits to step S417.

In step S416, the CPU 201 cancels the individual operation mode of the SLIC to perform initialization. That is, the CPU 201 returns, to "0", the value in the register indicating that the SLIC 108 has transited to the mode in which it individually operates, so that the SLIC 108 operates under the control of the CPU 201. At this time, a reset signal is issued to the SLIC 108, and various register settings are initialized. The clock used by the SLIC 108 is switched to a clock output from the bridge circuit 105 or modem 109. After that, the CPU 201 controls the SLIC 108 to control the telephone 112. Note that until the user confirms a dial stop instruction, it is necessary to allow the SLIC 108 to capture a dial signal whenever a dial number is input. To do this, the individual operation mode of the SLIC is canceled in step S416 after it is determined that the user has confirmed a dial stop instruction, thereby returning to the normal standby state.

On the other hand, if no dial stop instruction has been issued, the CPU 201 determines in step S417 whether the user has issued a dial instruction. If no next dial signal has been received for a time period equal to or longer than a threshold (for example, 10 sec) after the telephone 112 sends a dial signal last, it is determined that the user has issued a dial instruction. A dial instruction may be issued from the UI 126. Alternatively, if a special frequency or a dial number (for example, *) which is not usually used for a dial instruction is detected, it may be determined that the user has issued a dial instruction. If it is determined in step S417 that a dial instruction has been issued, the process transits to step S420; otherwise, the process transits to step S418.

In step S418, the CPU 201 determines whether the DSP 302 has detected a dial signal such as a DTMF signal or dial pulse signal from the telephone 112. If it is determined that the DSP 302 has detected a dial signal, the process advances to step S419; otherwise, the process returns to step S415. In step S419, the CPU 201 additionally holds the dial signal detected by the DSP 302 in the dial buffer of the SLIC 108. If "2" of the DTMF signal has been detected while "030000000" is stored in the dial buffer, "2" is additionally held in the dial buffer. Consequently, the dial buffer stores "0300000002".

If it is determined in step S417 that a dial instruction has been issued, the process advances to step S420, and the CPU 201 reads out the number held in the dial buffer of the SLIC 108. At this time, the SLIC 108 transmits the held number to the CPU 201, and the CPU 201 holds the number in the dial buffer of the controller 102, and advances the process to step S421. Note that the RAM 203 is used as the dial buffer of the controller 102. In step S421, the CPU 201 cancels the individual operation mode of the SLIC 108 to perform initialization. After that, the CPU 201 controls the SLIC 108 to control the telephone 112. The processing in step S421 is the same as that in step S416 described above. Until the user confirms a dial instruction, it is necessary to allow the SLIC 108 to capture a dial signal whenever a dial number is input. To do this, the individual operation mode of the SLIC 108 is canceled in step S421 after it is determined that the user has confirmed a dial instruction. The process advances to step S422, and the CPU 201 originates a call to the IP network 111 using the number held in the dial buffer of the controller 102. When voice communication ends, end processing is performed, thereby terminating the process.

As described above, according to the first embodiment, to satisfy the power consumption standard by reducing the electric current consumption in the sleep mode (energy saving mode), the mode in which power supply to the CPU 201 is cut off and the SLIC 108 individually operates is provided. This makes it possible to detect the off-hook of the telephone 112 even in the sleep mode. Even if the SLIC 108 is not controlled by the CPU 201 since the CPU 201 is being activated after detecting the off-hook of the telephone 112, the SLIC 108 can individually detect a dial signal, and hold a dial number input by the user in the dial buffer of the SLIC 108. Even after the CPU 201 is activated, the SLIC 108 individually detects a dial signal until the user issues a dial instruction. After the user issues a dial instruction, the CPU 201 can originate a call by reading out the dial number held in the SLIC 108. Therefore, a loss of a dial signal does not occur. Since the SLIC 108 is initialized before the CPU 201 originates a call to the IP network, it is possible to perform voice communication with an IP phone by using the telephone 112 connected to the SLIC 108.

Second Embodiment

The second embodiment of the present invention will be described. In the second embodiment, processing of transiting to the sleep mode and returning from the sleep mode when a telephone (handset) with no ten-key pad or a telephone (slave) with a ten key pad is connected instead of the telephone 112 according to the first embodiment will be explained.

Figure 6:
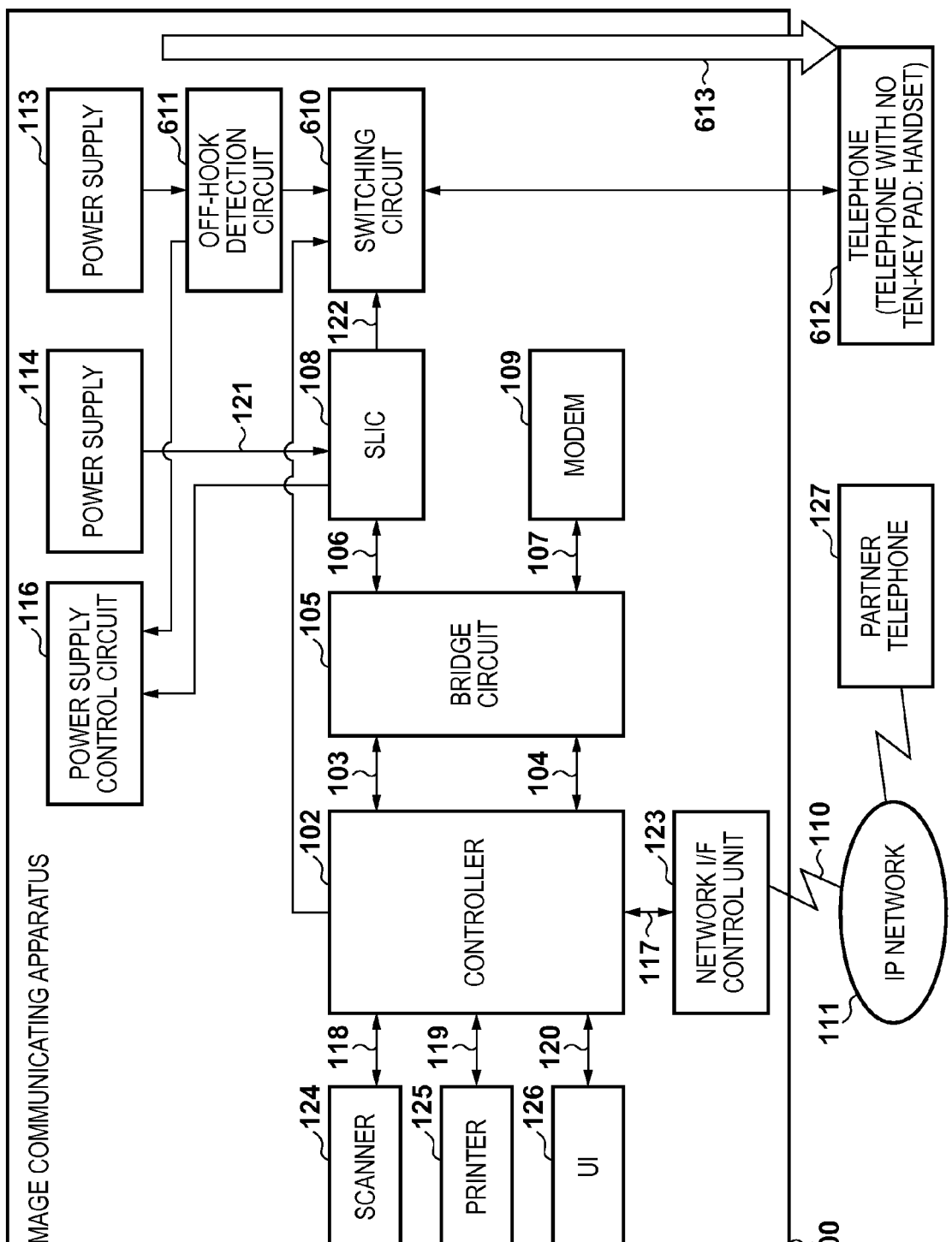
FIGS. 6 and 7 are block diagrams each showing the hardware arrangement of an image communicating apparatus.
Figure 7:
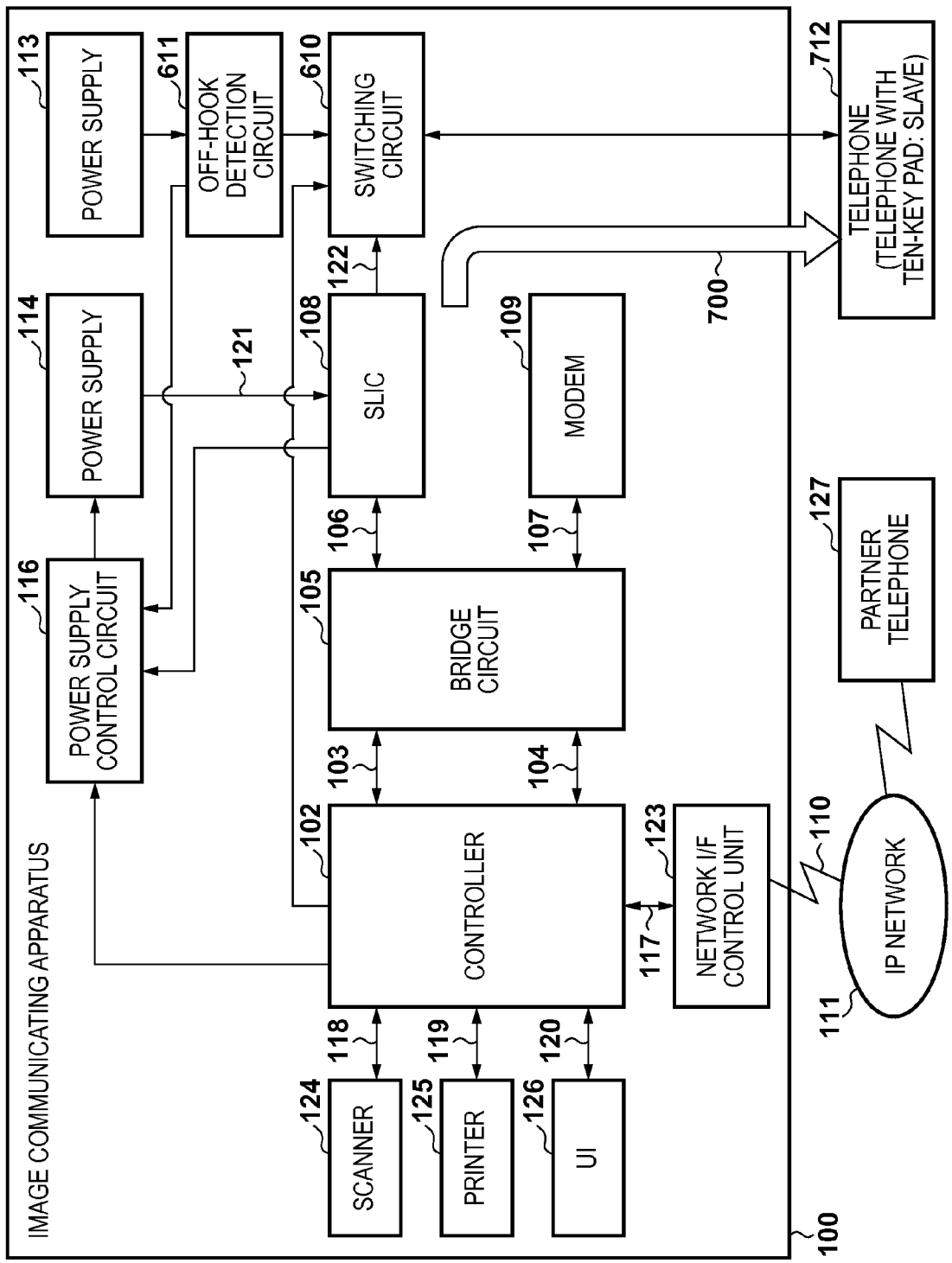

FIGS. 6 and 7 are block diagrams each showing the hardware arrangement of an image communicating apparatus 100 according to the second embodiment. Note that the same reference numerals as those in FIG. 1 according to the aforementioned first embodiment denote the same portions in FIGS. 6 and 7 and a description thereof will be omitted. The arrangement of a controller 102 and that of a SLIC 108 are the same as those in the aforementioned first embodiment and a description thereof will be omitted.

With respect to the block diagram shown in FIG. 1 according to the first embodiment, in FIG. 6, an off-hook detection circuit 611 and a switching circuit 610 are added and a telephone 612 is a telephone with no ten-key pad. With reference to the block diagram shown in FIG. 1 according to the first embodiment, in FIG. 7, an off-hook detection circuit 611 and a switching circuit 610 are added, and a telephone is a telephone (slave) 712 with a ten-key pad.

In the sleep mode, it is possible to select which one of the SLIC 108 and the off-hook detection circuit 611 detects the off-hook of the telephone 612 by switching the connection of the switching circuit 610. The connection of the switching circuit 610 can be switched when a CPU 201 controls the switching circuit 610 via an I/O port control unit 210 of the controller 102. For example, a mechanical relay can be used as the switching circuit 610. The switching circuit 610 switches the connection with the telephone 612 or 712 to the off-hook detection circuit 611. A power supply 113 supplies power to the off-hook detection circuit 611.

This makes it possible to detect the off-hook of the telephone 612 even if power supply to the SLIC 108 is stopped. Therefore, the power consumption of the telephone control system in the sleep mode can be reduced as compared with the aforementioned first embodiment. Note that the telephone function in the sleep mode is to only detect off-hook. If the off-hook detection circuit 611 detects off-hook, the CPU 201 and the SLIC 108 are activated, and the switching circuit 610 connects the telephone 612 or 712 to the SLIC 108 to execute a function as a telephone. In the normal standby state, the function of the telephone operates, and thus the switching circuit 610 connects the telephone 612 or 712 to the SLIC 108.

If the connection of the switching circuit 610 is switched to detect the off-hook of the telephone 612 or 712 by the SLIC 108 in the sleep mode, an off-hook detection voltage is supplied to the telephone 712 through a path indicated by an arrow 700 shown in FIG. 7. If the connection of the switching circuit 610 is switched to detect the off-hook of the telephone 612 by the off-hook detection circuit 611 in the sleep mode, an off-hook detection voltage is supplied to the telephone 612 through a path indicated by an arrow 613 shown in FIG. 6.

Figure 8:
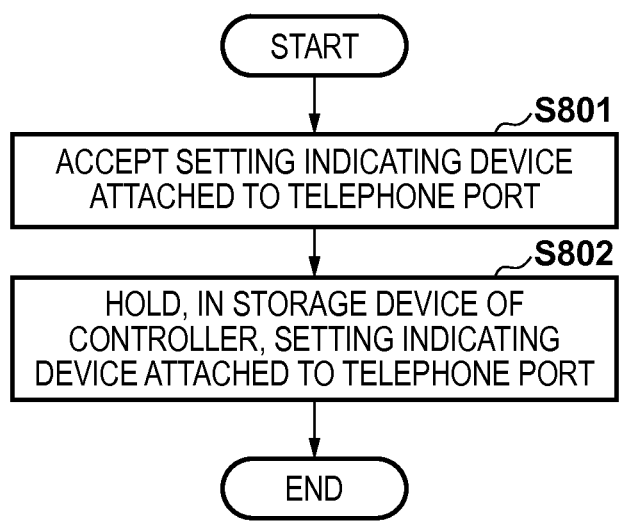
FIG. 8 is a flowchart illustrating telephone-related initial setting in the image communicating apparatus.

FIG. 8 is a flowchart for explaining telephone-related initial setting in the image communicating apparatus 100 according to the second embodiment.

When the image communicating apparatus 100 is placed at a location where the user uses it, and is powered on first, the user or serviceman performs telephone-related initial setting. This processing is implemented when the CPU 201 reads out a program from a ROM 202 or an HDD 217, loads it into a RAM 203, and executes it. When this processing starts, the CPU 201 reads out a telephone-related initial setting value from the HDD 217. If no initial setting of the telephone has been performed, initial setting is executed.

In step S801, the CPU 201 accepts a setting indicating a device attached to a telephone port, which is made by the user or serviceman via a UI 126 of the image communicating apparatus 100. For example, a message "Do you want to connect a telephone? YES/NO" is displayed on the display unit of the UI 126. If the user selects "YES" via the UI 126, a message "Do you want to connect a telephone (handset) with no ten-key pad? YES/NO" is displayed. If the user selects "NO", a message "Do you want to connect a telephone (slave) with a ten-key pad?YES/NO" is displayed. On the other hand, if the user selects "YES", a message "Please select a dialing system. Tone/Pulse 10PPS/Pulse 20 PPS/Automatic Identification" is displayed so as to select one of DTMF, pulse dial 10 PPS, and pulse dial 20 PPS. If the user selects "Automatic Identification", a message "Please dial 117 on the telephone" is displayed, and the user or serviceman inputs a telephone number "117" by operating the ten-key pad of the telephone. At this time, the user makes a setting using a result of identifying by a DSP 302 of the SLIC 108 whether the dialing system is DTMF, pulse dial 10 PPS, or pulse dial 20 PPS. In automatic identification, if the telephone number displayed on the display unit coincides with the number input from the telephone, a call may be originated to an IP network 111.

As described above, the user or serviceman sets to connect the telephone (handset) 612 with no ten-key pad, the telephone (slave) 712 with the ten-key pad, or no telephone to the telephone port. Alternatively, setting information may be input from another computer via a network 110 without using the UI 126. The user or serviceman can change the above setting at any time. The process then transits to step S802.

In step S802, based on the setting in step S801, the CPU 201 holds, in the HDD 217 of the controller 102, the setting indicating a device attached to the telephone port. For example, "1" is held for the telephone 612 with no ten-key pad, "2" is held for the telephone 712 with the ten-key pad, "9" is held when no telephone is connected, "0" is held when no initial setting has been performed, and "0" is held when a connected device is unknown. Alternatively, information may be held in the storage device (HDD 217) of a PC connected to the network 110, and then read out and used. The telephone-related initial setting then ends.

Figure 9:
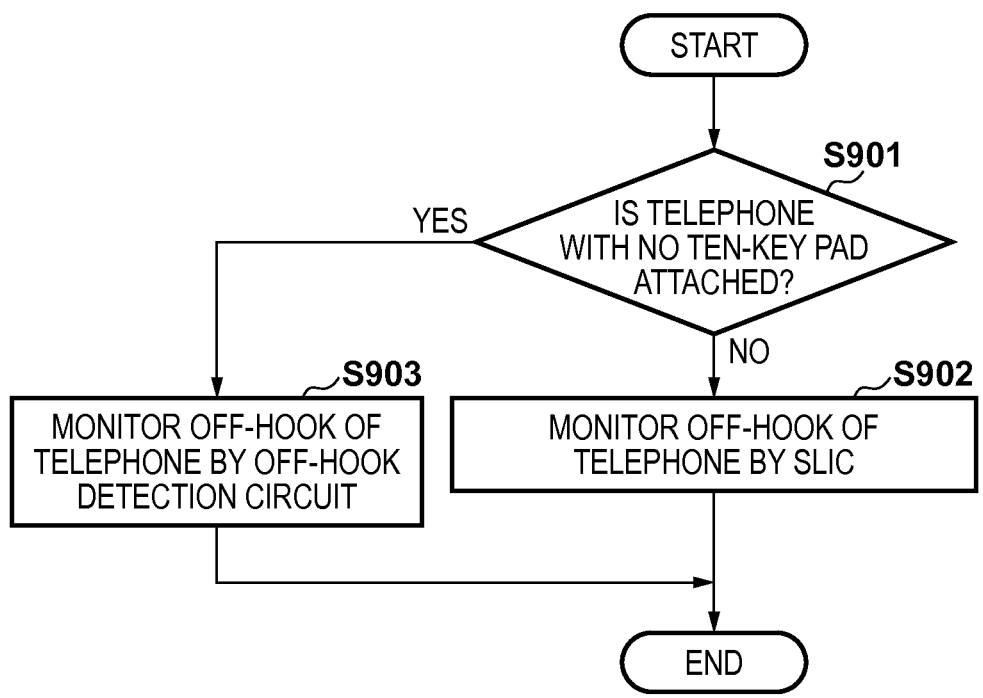
FIGS. 9 and 10 are flowcharts illustrating initial setting processing associated with selection of off-hook detection processing when transiting to the sleep mode in the image communicating apparatus.
Figure 10:
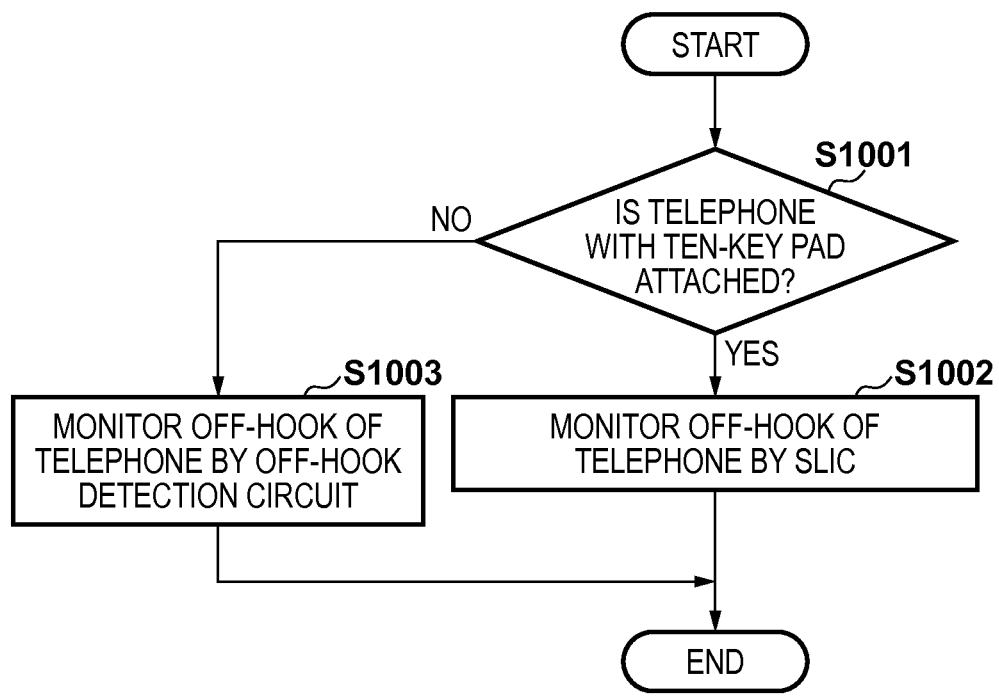

FIGS. 9 and 10 are flowcharts for explaining initial setting processing of selecting a unit to perform off-hook detection processing when transiting to the sleep mode in the image communicating apparatus 100 according to the second embodiment.

This processing starts when initial setting for detecting off-hook starts in the sleep mode. Referring to FIG. 9, in step S901, the CPU 201 reads out the setting value which is held in the HDD 217 and indicates a device attached to the telephone port. Based on the setting value, it is determined whether the telephone 612 with no ten-key pad is connected. If, for example, the setting value is "1", it is determined that the telephone 612 with no ten-key pad is connected. If the telephone 612 with no ten-key pad is connected, the process advances to step S903; otherwise, the process transits to step S902. In this case, since the telephone 612 with no ten-key pad is connected, no dial signal is sent from a telephone immediately after returning from the sleep mode. Since it is not necessary to detect a dial signal immediately after the SLIC 108 monitors and detects the off-hook of the telephone, the SLIC 108 can be powered off. In this case, therefore, the CPU 201 switches the connection of the telephone 612 to the off-hook detection circuit 611 using the switching circuit 610. At this time, the power supply 113 with high efficiency and low power consumption supplies power to the off-hook detection circuit 611. This can further reduce the power consumption in the sleep mode as compared with the aforementioned first embodiment.

In step S902, since the telephone 712 with the ten-key pad is connected, the time from when the user off-hooks the telephone 712 until he/she presses the ten-key pad to send a dial signal may be short. Therefore, the CPU 201 needs to immediately perform detection of a dial signal. To cope with this, processing in which the SLIC 108 monitors and detects the off-hook of the telephone 712 is performed when transiting to the sleep mode.

After that, based on the processing decided in step S902 or S903, the SLIC 108 or the off-hook detection circuit 611 performs off-hook detection in the sleep mode.

Referring to FIG. 10, in step S1001, the CPU 201 reads out the setting value which is held in the HDD 217 and indicates a device attached to the telephone port. If, for example, the setting value is "2", it is determined that the telephone 712 with the ten-key pad is connected. If the telephone 712 with the ten-key pad is connected, the process advances to step S1002; otherwise, the process transits to step S1003. In step S1002, since the telephone 712 with the ten-key pad is connected, the time from when the user off-hooks the telephone 712 until he/she presses the ten-key pad to send a dial signal may be short. Therefore, the CPU 201 needs to immediately perform detection of a dial signal. To cope with this, processing in which the SLIC 108 monitors and detects the off-hook of the telephone 712 is performed when transiting to the sleep mode. A setting value for selecting a processing sequence to be executed when transiting to the sleep mode is provided and saved in the HDD 217 or RAM 203. When actually transiting the sleep mode, the processing sequence shown in FIGS. 4 and 5 described above can be selected and executed with reference to the setting value. For example, "2" is saved as a setting value for selecting a processing sequence to be executed when transiting to the sleep mode. The process then ends.

Processing in step S1003 is performed when the CPU 201 determines that the telephone 612 with no ten-key pad is connected to the telephone port or no telephone is connected to the telephone port. In this case, since the telephone 612 with no ten-key pad is connected or no telephone is connected, no dial signal is sent from a telephone immediately after returning from the sleep mode. Since it is not necessary to detect a dial signal immediately after the SLIC 108 monitors and detects the off-hook of the telephone, the SLIC 108 can be powered off. In this case, therefore, the CPU 201 switches the connection of the telephone 612 to the off-hook detection circuit 611 using the switching circuit 610. At this time, the power supply 113 with high efficiency and low power consumption supplies power to the off-hook detection circuit 611. This can further reduce the power consumption in the sleep mode as compared with the aforementioned first embodiment.

Figure 11A:
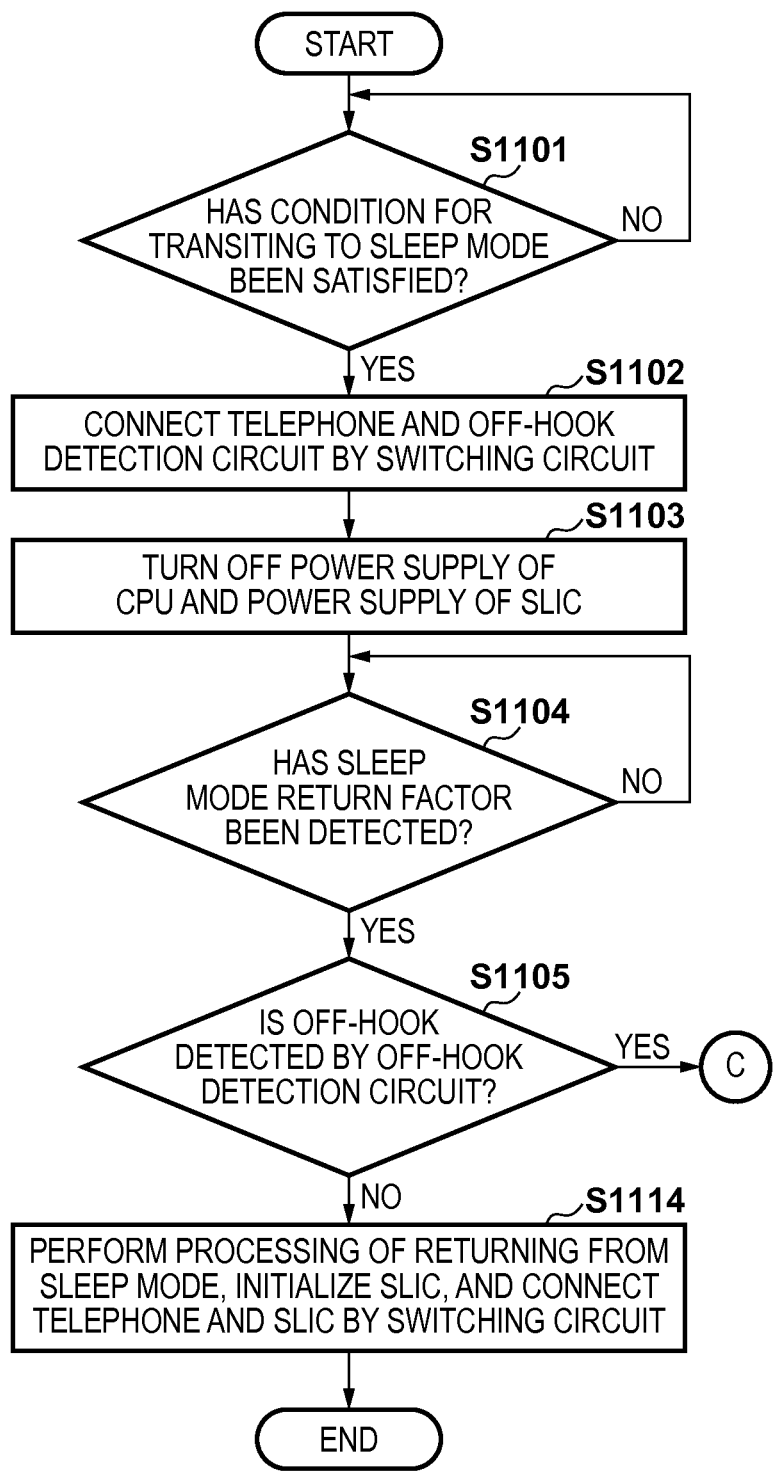

When actually transiting to the sleep mode, it is possible to select and execute, for example, a processing sequence shown in FIGS. 11A and 11B with reference to the setting value for selecting a processing sequence. For example, "1" is saved as the setting value for selecting the processing sequence shown in FIGS. 11A and 11B to be executed when transiting to the sleep mode. The process then ends.

After that, based on the processing decided in step S1002 or S1003, the SLIC 108 or the off-hook detection circuit 611 performs off-hook detection in the sleep mode.

Assume that activation of the image communicating apparatus 100 is complete, the image communicating apparatus 100 is in the standby state, and thus the user can perform an arbitrary operation. The difference from the aforementioned first embodiment is that the process branches by reading out the setting value for selecting a processing sequence to be executed when transiting to the sleep mode, which is saved in the HDD 217 or RAM 203, when a condition for transiting to the sleep mode is satisfied.

That is, when transiting to the sleep mode, if it has been decided to monitor the off-hook of the telephone by the SLIC 108, processing of transiting to the sleep mode is performed according to the flowcharts shown in FIGS. 4 and 5 described in the aforementioned first embodiment. On the other hand, if it has been decided to monitor the off-hook of the telephone by the off-hook detection circuit 611, processing of transiting to the sleep mode is performed according to a flowchart shown in FIGS. 11A and 11B in the second embodiment. The flowcharts shown in FIGS. 4 and 5 are as described above, and the flowchart shown in FIGS. 11A and 11B will be explained next.

FIGS. 11A and 11B are flowcharts for explaining processing executed by the image communicating apparatus 100 when transiting to the sleep mode and activating from the sleep mode according to the second embodiment of the present invention. The processing shown in the flowchart is implemented when the CPU 201 reads out a program from the ROM 202 or HDD 217, loads it into the RAM 203, and executes it.

First, the image communicating apparatus 100 is in the standby state after power-on. As decided in step S1003 of FIG. 10, it has been decided to detect the off-hook of the telephone by the off-hook detection circuit 611 in the sleep mode. In step S1101, the CPU 201 determines whether the condition for transiting to the sleep mode has been satisfied. If no copy instruction from the user, no print instruction from a network I/F control unit 123, no incoming voice call, or no T.38 incoming FAX call has been received for a given time, it is determined that the condition for transiting to the sleep mode has been satisfied, and the process transits to step S1102. Note that the time is counted by using the RTC (not shown) of a UI control unit 211 or the operation clock of the CPU 201 or the like. In step S1102, the CPU 201 switches the switching circuit 610 to the off-hook detection circuit 611 side to detect off-hook by the off-hook detection circuit 611, and advances the process to step S1103. The power supply 113 and off-hook detection circuit 611 are formed from circuits with high efficiency and low power consumption.

In step S1103, to transit to the sleep mode, the CPU 201 performs processing of stopping circuits other than those for monitoring a return factor which causes the CPU to return from the sleep mode. After that, a power supply control circuit 116 is controlled to stop power supply to the circuits other than those for monitoring a return factor which causes the CPU to return from the sleep mode. The power supply control circuit 116 turns off part of a power supply 114. In the sleep mode, power supply to the circuits to be powered off, for example, power supply to the controller 102 including the CPU 201, a modem 109, a bridge circuit 105, a scanner 124, a printer 125, and the backlight of the display unit of the UI 126 is stopped. Furthermore, power supply to the SLIC 108 including the DSP 302 and a DC/DC converter 315 is stopped. The power supplies 114 and 113 are controlled to maintain power supply to the circuits for monitoring a return factor which causes the CPU to return from the sleep mode, for example, part of the UI control unit 211, the network I/F control unit 123, and the off-hook detection circuit 611. If it is configured to connect the telephone to the off-hook detection circuit 611 when power supply to the switching circuit 610 is stopped, it is possible to further reduce the power consumption. In this way, power supply to the CPU 201 and the SLIC 108 is stopped. When transiting to the sleep mode, the process transits to step S1104.

In the sleep mode, the circuits for monitoring a return factor which causes the CPU to return from the sleep mode monitors. If the circuits detect a sleep mode return factor, the process advances to step S1105; otherwise, the process returns to step S1104. The off-hook detection circuit 611 monitors the off-hook of the telephone. Also, the network I/F control unit 123 monitors a return factor such as reception of a print job, T.38 FAX reception, G3 FAX reception of a deemed voice, an incoming call from an IP phone, or a key operation in the UI 126 to return from the sleep mode.

In step S1105, if the telephone is off-hooked in the sleep mode, it captures a DC current. If the off-hook detection circuit 611 detects that a DC current equal to or higher than a threshold flows or an off-hook voltage for off-hook detection decreases to a threshold or lower, and it is determined that the telephone has been off-hooked, the process advances to step S1106. On the other hand, if the off-hook detection circuit 611 detects no off-hook of the telephone in step S1105, the process advances to step S1114.

In step S1106, the off-hook detection circuit 611 sends an activation signal to the power supply control circuit 116. This causes the power supply control circuit 116 to turn on the power supply 114. Power supply to the controller 102 including the CPU 201, the modem 109, the bridge circuit 105, the SLIC 108, and the DC/DC converter 315 is enabled. The CPU 201 starts activation processing by reading out the control program of the image communicating apparatus 100 from the ROM 202 or HDD 217, loading it in the RAM 203, and executing it. It takes about 5 sec to execute the activation processing. The process then transits to step S1107. In step S1107, the CPU 201 determines whether the activation processing is complete. If the activation processing is complete, the process transits to step S1108; otherwise, the processing in step S1107 is executed. Until the activation processing is completed, an LED provided in the UI 126 may be flickered to notify the user that the activation processing is in progress due to off-hook detection. An LED flickering circuit may be driven by connecting the power supply 113, off-hook detection circuit 611, and UI 126 and using an electric current flowing to the off-hook detection circuit 611.

In step S1108, after initializing the SLIC 108, the CPU 201 transits to a state in which it controls the SLIC 108. In this state, the SLIC 108 can control the overall telephone. The process advances to step S1109, and the CPU 201 switches the switching circuit 610 to connect the telephone and the SLIC 108. A DC voltage is thus applied to a telephone 112. Since the telephone 112 has been off-hooked, the DSP 302 immediately detects the off-hook, and a dial tone is sent to the telephone. The process advances to step S1110, and the CPU 201 performs dialing waiting display on the display unit of the UI 126 of the image communicating apparatus 100, and accepts and holds a number input via the ten-key pad or the touch panel of the UI 126. In this example, since the telephone (handset) 612 with no ten-key pad is connected, it sends no DTMF signal or dial pulse signal. Alternatively, if the telephone 612 is not attached, it is considered that no dial signal is sent from the telephone 612 immediately after returning from the sleep mode. The process advances to step S1111, and the CPU 201 determines whether a dial stop instruction has been issued. At this time, since the CPU 201 has been activated to control the overall apparatus, it is possible to detect an operation input via the UI 126. If, for example, the user issues a dial stop instruction by operating the touch panel or key of the UI 126, this processing ends, thereby returning to the normal standby state.

Even if the user on-hooks the telephone 612 and the SLIC 108 detects the on-hook of the telephone 612, it is determined that a dial stop instruction has been issued. If no dial stop instruction has been issued, the process transits to step S1112. In step S1112, the CPU 201 determines whether the user has issued a dial instruction. If the user issues a dial instruction from the UI 126, the process advances to step S1113; otherwise, the process returns to step S1110. In step S1113, the CPU 201 holds the number input via the UI 126 of the image communicating apparatus 100 in the dial buffer of the controller 102, and originates a call to the IP network 111 by using the number. When voice communication ends, the process ends.

If the off-hook detection circuit 611 does not detect in step S1105 that the telephone 612 has been off-hooked, the process advances to step S1114. In step S1114, if the network I/F control unit 123 detects reception of a print job, T.38 FAX reception, G3 FAX reception of a deemed voice, an incoming call from an IP phone, or a key operation as a return factor in the UI 126, an activation signal is sent to the power supply control circuit 116. Then, the power supply control circuit 116 controls the power supply 114 to turn it on, thereby starting power supply to the controller 102 including the CPU 201 and other units required to operate. This causes the CPU 201 to read out a program from the ROM 202 or HDD 217, load it into the RAM 203, and execute it, thereby starting activation processing. A return factor which causes the CPU to return from the sleep mode is discriminated to perform appropriate processing. At this time, after the CPU 201 initializes the SLIC 108, it controls the SLIC 108 to perform control processing of the telephone 612. The CPU 201 switches to connect the telephone 612 and the SLIC 108 using the switching circuit 610. A DC voltage is thus applied to the telephone 612, thereby allowing the DSP 302 of the SLIC 108 to perform off-hook detection. Processing of returning from the sleep mode executed by a factor other than off-hook detection by the SLIC 108 is not essential to the embodiment, and a description thereof will be omitted. The process ends, thereby transiting to the normal standby state.

As described above, conventionally, power supply to the CPU 201 is stopped in the sleep mode, and the SLIC 108 is set in the mode in which the SLIC 108 individually operates so as to be able to use the telephone even in the sleep mode, thereby monitoring off-hook by the SLIC 108. To the contrary, in the second embodiment, when the telephone (handset) with no ten-key pad is connected, it is necessary to display the UI and input a partner destination number using a ten-key pad after detecting the off-hook of the telephone and returning from the sleep mode. The second embodiment focuses on that it is possible to make the user wait until the CPU 201 is activated. If the telephone with no ten-key pad is connected, the switching circuit 610 connects the telephone and the off-hook detection circuit 611, and the off-hook detection circuit 611 detects the off-hook of the telephone. The power supply 113 and off-hook detection circuit 611 are formed from power supply circuits with high efficiency and low power consumption. Therefore, in the sleep mode, it is possible to further reduce the electric current consumption.

If the telephone (slave) 712 with the ten-key pad is connected, the CPU transits to the sleep mode, the switching circuit 610 connects the telephone and the off-hook detection circuit 611, and the off-hook detection circuit 611 detects the off-hook of the telephone. In this case, it takes about 5 sec from when the off-hook of the telephone is detected until activation of the CPU 201 is completed. For a slave of an analog FAX, it takes about 1 sec or less from off-hook to connection to an exchange, which is less than 5 sec.

If the telephone 712 with the ten-key pad is connected to the image communicating apparatus 100, it is assumed that the user presses the ten-key pad of the slave at the same timing as that of the slave of the analog FAX immediately after the off-hook of the telephone is detected. At this time, the CPU does not control the SLIC 108 yet, and thus a telephone number input by operating the ten-key pad of the slave by the user cannot be detected and is lost. As a result, a telephone number different from that intended by the user is stored in the dial buffer, and it is thus impossible to originate a call to the partner destination intended by the user. To avoid such situation, if the telephone 712 with the ten-key pad is connected, when transiting to the sleep mode, the switching circuit 610 switches the connection so that the SLIC 108 detects the off-hook of the telephone 712, thereby executing the same control operation as that in the aforementioned first embodiment. Since the SLIC 108 is initialized before the CPU 201 originates a call to the IP network 111, voice communication of an IP phone can be performed by the telephone 712 connected to the SLIC 108 without any problem.

It is possible to further reduce the power consumption according to the user use condition by setting, by the user or serviceman, which of the handset and the slave is connected to the image communicating apparatus 100, holding the setting, and switching the processing when transiting to the sleep mode.

Third Embodiment

In the third embodiment, the arrangement of an image communicating apparatus 100 shown in FIG. 6 or 7 is used.

The difference between the second and third embodiments is only a processing sequence shown in FIG. 8. A processing sequence will be described according to a flowchart shown in FIG. 8. In the third embodiment, the image communicating apparatus 100 is arranged at a location where the user uses it. Even when the image communicating apparatus 100 is powered on first, neither the user nor the serviceman performs telephone-related initial setting.

If the off-hook of a telephone 112 is detected when a CPU 201 of a controller 102 is in the standby state, the processing sequence shown in FIG. 8 when telephone-related initial setting is performed starts.

In this example, information is displayed on the display unit of a UI 126 to prompt the user to input a dial number. The process advances to step S802. If, in step S801, no dial signal can be detected within a given time after off-hook is detected, it is determined that a telephone (handset) with no ten-key pad is connected, and a telephone connected to a telephone port is set. On the other hand, if a dial signal can be detected within the given time after off-hook is detected, it is determined that a telephone (slave) with a ten-key pad is connected, and a telephone connected to the telephone port is set. At this time, it is determined whether the dialing system is DTMF, pulse dial 10 PPS, or pulse dial 20 PPS. The process advances to step S802. Based on the setting in step S801, the setting of the telephone connected to the telephone port is held in an HDD 217 of the controller 102. The process then ends. After that, when the user issues a call origination instruction, the CPU 201 originates a call to an IP network 111 using a detected or input number.

According to the third embodiment, it is possible to automatically identify whether the telephone connected to the telephone port is a telephone with a ten-key pad according to whether it is possible to detect a dial signal within a predetermined time after the off-hook of the telephone is detected. The subsequent processing is the same as in the above-described embodiments, and a description thereof will be omitted.

Fourth Embodiment

The fourth embodiment of the present invention will be described.

In the fourth embodiment, only processes shown in step S422 of FIG. 5 and step S1113 of FIGS. 11A and 11B are different from those in the above-described embodiments.

If the number of digits of a telephone number stored in the dial buffer of a controller 102 is smaller than that used for originating a normal domestic call, guidance is displayed on the display unit of a UI 126, and a guidance voice is also sent to a telephone 112. The guidance is "the number of digits of a detected telephone number is smaller than that used for originating a normal call. Please hang up the telephone once, and re-input a telephone number". Call origination to an IP network 111 is interrupted. The remaining processing is the same.

According to the fourth embodiment, when the number of digits of dial signals detected when the telephone is off-hooked is smaller than that used for originating a normal call, guidance is output to give a warning. This can decrease the occurrence of a situation in which a call is not originated using a telephone number intended by the user, thereby improving the user convenience.

The present invention is not limited to the above embodiments, and various changes and modifications can be made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041050, filed Mar. 3, 2014, which is hereby incorporated by reference herein in its entirety.

What is claimed is:

1. A communicating apparatus to which a telephone is able to be connected, comprising:
   a CPU;
   a telephone controller configured to control a telephone which is connected to the communicating apparatus; and
   a power supply controller,
   wherein the telephone controller comprises:
   a detection unit configured to detect an off-hook;
   an instruction unit configured to instruct the power supply controller to cancel a sleep mode in which no power supplies to the CPU, in a case where the communicating apparatus operates in the sleep mode and the detection unit detects the off-hook;
   holding unit configured to hold a dial signal of a dial input on the telephone, from the instruction unit instructs the power supply controller to cancel the sleep mode until activation processing of the CPU is completed; and
   a transmission unit configured to transmit the dial signal held by the holding unit to the CPU, after the activation processing of the CPU is completed.

2. The communication apparatus according to claim 1, wherein the transmission unit transmits the dial signal held by the holding unit to the CPU, in a case where the activation processing of the CPU is completed and the CPU detects a dial instruction.

3. The communication apparatus according to claim 1, wherein the transmission unit transmits the dial signal held by the holding unit to the CPU, in a case where the activation processing of the CPU is completed and no next dial signal occurs for a predetermined time period.

4. The communication apparatus according to claim 1, wherein the telephone controller is able to operate either in a first mode that the telephone controller operates under control of the CPU, or in a second mode that the telephone controller operates without control of the CPU, and
   wherein the CPU sets the second mode as an operation mode of the telephone controller in a case where the communicating apparatus starts to operate in the sleep mode, and the CPU sets the first mode as the operation mode of the telephone controller in a case where the communicating apparatus cancels the sleep mode.

5. The communication apparatus according to claim 1, further comprising a printer, and
   wherein power is not supplied to the CPU and the printer in a case where the communicating apparatus operates in the sleep mode.

6. The communication apparatus according to claim 1, further comprising a printer and a scanner, and
   wherein power is not supplied to the CPU, the printer and the scanner in a case where the communicating apparatus operates in the sleep mode.

7. A method for a communicating apparatus to which a telephone is able to be connected, comprising:

controlling a telephone which is connected to the communicating apparatus;

detecting an off-hook;

instructing a power supply controller of the communicating apparatus to cancel a sleep mode in which no power supplies to a CPU of the communicating apparatus, in a case where the communicating apparatus operates in the sleep mode and the detection unit detects the off-hook;

holding a dial signal of a dial input on the telephone, from the instructing of the power supply controller to cancel the sleep mode until activation processing of the CPU is completed; and transmitting the dial signal held by the holding to the CPU, after the activation processing of the CPU is completed.

8. A non-transitory computer-readable storage medium storing a program for causing a computer to execute each step of a control method for a communicating apparatus to which a telephone is able to be connected, the control method comprising:

controlling a telephone which is connected to the communicating apparatus;

detecting an off-hook;

instructing a power supply controller of the communicating apparatus to cancel a sleep mode in which no power supplies to a CPU of the communicating apparatus, in a case where the communicating apparatus operates in the sleep mode and the detection unit detects the off-hook;

holding a dial signal of a dial input on the telephone, from the instructing of tthe power supply controller to cancel the sleep mode until activation processing of the CPU is completed; and transmitting the dial signal held by the holding to the CPU, after the activation processing of the CPU is completed.

* * * * *